United States Patent [19]

Almond et al.

[11] 4,361,001
[45] Nov. 30, 1982

[54] COLLECTING ACCESSORY FOR AIR SUPPORTED LAWN MOWER

[76] Inventors: David R. Almond, 190 JB Dekeyser Straat, 1970 Wezenbeek-Oppem, Brussels, Belgium; David Baggett, Toft Gate Farm, Burnopfield, Newcastle-upon-Tyne NE16 6AG; Colin Turner, 59 Barley Mill Rd., Bridgehill, Consett, Co. Durham DH8 8JS, both of England

[21] Appl. No.: 254,146

[22] Filed: Apr. 14, 1981

[30] Foreign Application Priority Data

Apr. 15, 1980 [EP] European Pat. Off. ...... 80/850053.2

[51] Int. Cl.³ ............................................. A01D 53/00
[52] U.S. Cl. ................................. 56/12.8; 56/13.4; 56/202; 56/DIG. 3
[58] Field of Search ................. 56/12.8, 13.4, 202, 56/DIG. 3

[56] References Cited

U.S. PATENT DOCUMENTS

| 3,452,523 | 7/1969 | Svensson | 56/12.8 |
| 3,838,558 | 10/1974 | Goodchild | 56/12.8 |
| 4,245,455 | 1/1981 | Martin | 56/12.8 |
| 4,245,456 | 1/1981 | Zipfel | 56/12.8 |

FOREIGN PATENT DOCUMENTS 1482002  5/1969  Fed. Rep. of Germany ....... 56/12.8

*Primary Examiner*—Jay N. Eskovitz
*Attorney, Agent, or Firm*—Alfred E. Miller

[57] ABSTRACT

A hover-type lawn mower being provided with a cover which fits over the shroud or housing for the rotatable blade. The cover is provided with openings so that the air flow therethrough forms an air cushion and also transports cut grass and leaves to a collecting area in the cover. The cover is further provided with releasable fastening means to the shroud, so that the cover can be removed when it is desired to empty the collected cut grass and leaves therein.

7 Claims, 3 Drawing Figures

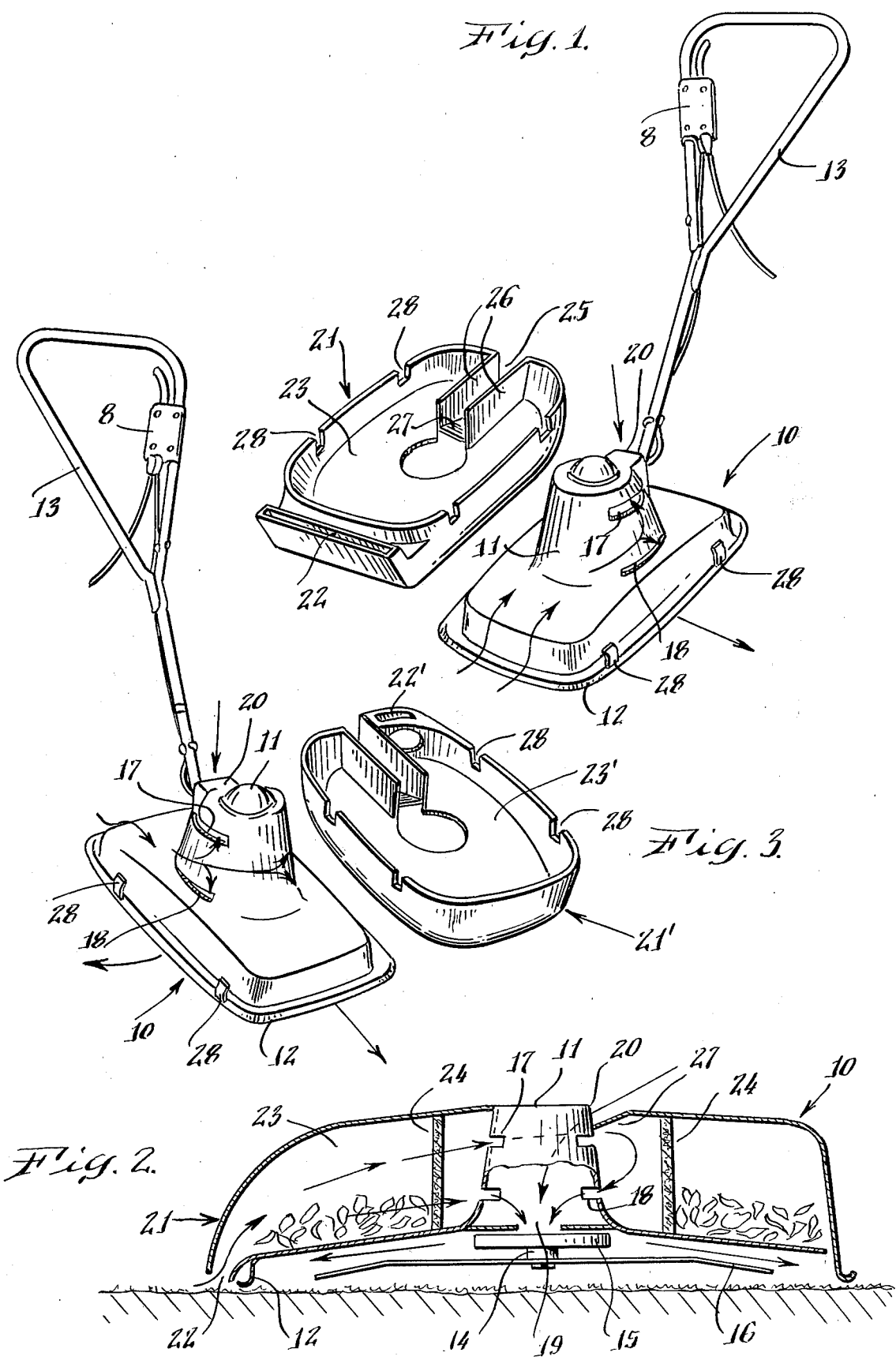

COLLECTING ACCESSORY FOR AIR SUPPORTED LAWN MOWER

The present invention relates to a lawn mower of the type which in operation is supported by a cushion of air and has a blade which is rotatable about a vertical axis, and a fan wheel rotatable about the same axis. Moreover, the fan wheel and the blade are shrouded by a hood with a rim extending around the periphery of the hood, the hood having at least one opening for air to the air cushion.

It is known to collect grass during cutting when using mowers of the above-described type. This function is illustrated in British patent application No. 2,017,475 and is achieved because the air stream building up the air cushion is also used to transport the cut grass. The latter is transferred to a separate bag attached to the rear of the mower. In order to obtain a good function it is necessary to shape appropriately the underside of the hood, as well as the transportation channel.

The lawn mower constructed in accordance with the present invention is an alternative to the device described above and may be used without any major constructional changes of a conventional air cushion mower and still give an excellent collecting result. According to the invention, the air stream to the fan wheel, before reaching the fan wheel, is used to pick up and transport grass, leaves etc. from the ground to a discharge or collecting place.

In order that the invention will be more clearly understood, it will now be disclosed in greater detail with reference to the accompanying drawings, in which:

FIG. 1 is a perspective view of the present invention showing a conventional air cushion mower which can be provided with a cover, shown in a detached and upside-down condition, in order to create the air stream shown by the arrows in the Figure.

FIG. 2 is an enlarged vertical section of the same mower provided with cover in place.

FIG. 3 is a perspective view of another embodiment of the invention provided with a cover shown in a detailed and upside-down condition, and the arrows showing the paths of air flow.

As shown in FIGS. 1 and 2 the mower comprises a hood 10 which supports a housing 11 for an electric motor (not shown). The hood has a rim 12, which extends around the periphery of the mower, and a handle 13, which has a switch 8 for the electric motor. The motor has a vertical shaft 14 on which a fan wheel 15 and a blade 16 are mounted. The fan wheel creates an air cushion under the hood by drawing air from the upper side of the hood and distributing it to the underside thereof. This air stream is taken in through first slots 17 in the housing 11 and through second slots 18 between the housing 11 and the hood 10, and is led to the fan wheel 15 through one or more openings 19 in the center of the hood 10. Cooling air to the motor is simultaneously sucked into a separate inlet 20 in the upper part of the housing 11 by the fan wheel 15, and this air stream passes over the motor before it is delivered to the air cushion.

Thus, the above device is a conventional air cushion mower. However, by providing such a mower with a cover 21 of particular shape, the air being sucked into the fan wheel can be used to take up cut grass, leaves and the like from a lawn and to transport it to a space within the cover. This is achieved by an air stream as illustrated by the arrows in FIG. 1. In order to provide such an air stream, the cover has a nozzle opening 22, which when the cover is fastened to the hood is adjacent the rim 12 of the hood 10. This nozzle opening extends the complete width of the front part of the mower. The cover 21, together with a portion of the hood, forms a chamber 23 to which grass and leaves are transported. In order to separate grass and leaves in the chamber 23, and to prevent them from entering the air cushion, the chamber 23 is provided with a filter 24. Air from the chamber 23 is supplied to the air cushion via the fan wheel 15.

In order not to hinder vertical movement of the handle 13 there is a recess 25 in the rear part of the cover. This recess 25 is limited by side walls 26 and an upper wall 27, which is shaped so that cooling air to the motor is taken in the normal way directly from the atmosphere. The chamber 23 is emptied by removing the cover 21 from the hood 10, to which it is fastened by any suitable means 28.

FIG. 3 illustrates an alternate embodiment in which like parts bear like reference numerals and wherein the cover 21' has a nozzle opening 22' which is disposed at a concentrated area in the rear part of the mower thereby creating the air stream which is shown by the arrows in the Figure. The object of this arrangement is to pick up cut grass, which normally forms a windrow behind the mower at one of its sides, since the cut grass, depending on the direction of rotation of the blade is thrown against one of the inner side walls of the hood. By disposing the nozzle opening above the area where the windrow normally is formed, the grass is sucked into the chamber 23' to which it is delivered before the air stream continues into the air cushion via the fan wheel.

It is of course possible to place the nozzle opening at any suitable location on the mower, and to combine the above nozzle openings in one and the same cover by providing the cover with means making it possible to block one nozzle opening when the cover is open, or to have both nozzle openings open simultaneously.

The use of conventional vacuum cleaner accessories with the present invention would also be possible by means of a suitable adaptor.

Although two embodiments of the present invention have been disclosed and described herein, it will be apparent that other variations and modifications may be made therein without departing from the spirit and scope of the invention as defined in the following claims.

What is claimed is:

1. In a hover-type lawn mower which when operative is supported by a cushion of air and is provided with a rotatable blade about a vertical axis, a fan wheel rotatable about said axis, a hood shrouding said fan wheel and blade, said hood being provided with a peripheral rim and having at least one opening for air to said air cushion, the improvement comprising: a cover, means releasably fastening said cover to said hood, said cover having at least one opening whereby an air stream created by said fan wheel passing through said opening picks up and transports cut grass, leaves and the like from the ground area to said cover before reaching said fan wheel, and which functions as a collecting chamber for said cut grass, leaves and the like, said air stream thereafter continuing into said fan wheel and thereafter into said air cushion.

2. A hover-type lawn mower as claimed in claim 1 wherein said opening in said cover is a nozzle opening, and further comprising at least one opening in the hood which communicates with said nozzle opening, the latter being located adjacent to said peripheral rim.

3. A hover-type lawn mower as claimed in claim 2 wherein said nozzle opening extends over the width of the front part of said mower.

4. A hover-type lawn mower as claimed in claim 2 wherein said nozzle opening is located at the rear part of said hood adjacent to one of its side walls.

5. A hover-type lawn mower as claimed in claim 2 further comprising a filter separating each nozzle opening from each opening in said hood.

6. A hover-type lawn mower as claimed in claim 5 further comprising an electric motor and wherein said cover is provided with means by which a separate cooling air stream can be directed to the motor.

7. In a hover-type lawn mower which when operative is supported by a cushion of air and is provided with a rotatable blade about a vertical axis, a fan wheel rotatable about said axis, a hood shrouding said fan wheel and blade, said hood being provided with a peripheral rim and having at least one opening for air to said air cushion, the improvement comprising: a cover, means releasably fastening said cover to said hood, said cover having at least one opening which is a nozzle opening, and at least one opening in the hood which communicates with said nozzle opening, the latter being located adjacent to said peripheral rim, and the communication between the nozzle opening and the hood opening forming a collecting chamber in said cover, and said air stream passing through said openings picks up and transports cut grass, leaves and the like from the ground area to said collecting chamber in said cover.

* * * * *